United States Patent Office 3,388,104
Patented June 11, 1968

3,388,104
POLYCARBONAMIDES HAVING AN IMPROVED
ANTISTATIC PROPERTY
Lawrence W. Crovatt, Jr., Raleigh, N.C., assignor to
Monsanto Company, St. Louis, Mo., a corporation of
Delaware
No Drawing. Continuation-in-part of application Ser. No.
579,509, Sept. 15, 1966. This application Oct. 11, 1967,
Ser. No. 674,662
7 Claims. (Cl. 260—78)

ABSTRACT OF THE DISCLOSURE

Polyamides, useful in the production of fibers which have greatly improved anti-static properties, are produced by incorporating into the polymer prior to filament formation from 0.1 to 20.0 weight percent of a polyalkyoxylated triglyceride of a saturated fatty acid having 10 to 30 carbon atoms.

---

This application is a continuation-in-part of S.N. 579,509 filed Sept. 15, 1966, now abandoned which in turn is a continuation-in-part of S.N. 422,822 filed Dec. 31, 1964, now abandoned.

The polymeric substances of which this invention is concerned are synthetic high molecular weight fiber-forming polycarbonamides of the general type characterized by the presence of recurring carbonamide groups as an integral part of the polymer chain, and wherein such groups are separated by at least two carbon atoms. They are further characterized by high melting point, pronounced crystallinity and insolubility in most solvents except mineral acids, formic acid and phenols. Upon hydrolysis with strong mineral acids the polymers revert to the reactants from which they were formed.

The polyamides of this type are usually made by heating either (a) substantially equimolecular proportions of a diamine and dicarboxylic acid or (b) various amino acids and amide-forming derivatives thereof until the material has polymerized to the fiber-forming stage, which stage is not generally reached, until the polyamide has an intrinsic viscosity of at least 0.4, the intrinsic viscosity being defined as:

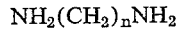

in which $\eta_r$ is the relative viscosity of a dilute solution of the polymer in m-cresol in the same units and at the same temperature and C is the concentration in grams of polymer per 100 cc. of solution. The polymers thus obtained have high melting points and can be cold drawn to form strong highly oriented fibers.

The diamines and dicarboxylic acids and amide-forming derivatives thereof which can be used as reactants to yield the fiber-forming polyamides are well known in the art. Suitable diamines may be represented by the general formula $$NH_2(CH_2)_nNH_2$$

in which $n$ is an integer of two or greater, preferably from 2 to 10. Representative examples are ethylene diamine, propylene diamine, tetramethylene diamine, pentylmethylene diamine, hexamethylene diamine, octamethylene diamine, and decamethylene diamine. Suitable dicarboxylic acid reactants are represented by the general formula:

in which R is a divalent hydrocarbon radical having a chain length of at least two carbon atoms. These dicarboxylic acids may be illustrated by sebacic acid octadecanedioic acid, adipic acid, suberic acid, azelaic acid, undecanedioic acid, glutaric acid, pimelic acid, brassylic acid, and tetradecanedioic acid.

In place of the above-noted dicarboxylic acids and diamines the amide-forming derivatives thereof can be employed to form fiber-forming polymers. Amide-forming derivatives of the diamines include the carbamates and N-formyl derivative. Amide-forming derivatives of the dibasic carboxylic acids comprise the mono- and di-ester, the anhydride, the mono- and diamide, and the acid halide.

In addition to the above diamines and dicarboxylic acids and their derivatives, the polyamides of this invention may be prepared from certain of the amino acids. The amino acids are represented by the general formula:

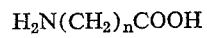

in which $n$ is an integer of four or more and preferably from 4 to 11. Illustrative examples of these amino acids are 6-aminocaproic acid, 7-amino-heptanoic acid, 8-aminooctanoic acid, 9-aminononanoic acid, 10-aminodecanoic acid, 11-aminoundecanoic acid, 12-aminododecanoic acid, 13-aminotridecanoic acid, and 22-aminobehenic acid. Also the lactams of these amide acids may be used as monomers from which the polyamides of the present invention may be prepared.

In addition to the homopolyamides, copolyamides and terpolyamides are also contemplated and are within the scope of this invention. The copolyamides and terpolyamides are obtained in known manner. That is, mixtures of diamines and dibasic acids, are used in forming the co- and ter-polymers, with the diamine being present in substantially equimolar proportions to the total dibasic acids present during the polymer-forming reaction. The co- and ter-polymeric products may be formed directly from the corresponding monomers, or one or more homo-polymers may be added to the polymerizable reactants, distribution of the desired units entering the products via amide interchange. Formation of the desired diamine salts of the various dibasic acids prior to melt polymerization assist in control of the reaction. The conventional polyamide melt polymerization cycle is suitable.

It is known that fibers obtained from the polyamides prepared from some of the above reactants have obtained wide commercial importance and success. Although the fibers prepared from these polyamides have much to commend them, there is still need for new and improved properties. It is common knowledge that fibers prepared from these conventional polyamides tend to collect and retain, for periods of time, static electrical charges when coming into contact with each other or into contact with foreign objects. This problem is particularly severe under conditions of low humidity, which is often the case during winter months. The electrostatic charge build-up on the fibers can occur quite rapidly and often times dissipation of the charge into the environmental atmosphere is extremely slow; a consequence of which, is that the polyamide article may remain electrostatically charged for hours at the time. This property tends to make the filaments difficult to handle during manufacturing operations and results in objectionable fiber properties, particularly in wearing apparel. Electrostatically charged textile materials may not only repel each other but may also attract and hold such things as dust, dirt and lint. The accumulation of static charges and the slow dissipation thereof on the fibers prevents finished, synthetic fabrics from draping and wearing in a desirable manner, and causes the same to cling uncomfortably to the body of the person wearing them. Fibers having a high electrostatic susceptibiilty often cling to guides and rolls in textile machinery during the manufacturing and processing thereof and are sometimes seriously damaged and weakened. As a result, the quality of the end product is lower than it might otherwise be.

For these reasons, and because end-uses such as garments, upholstery, hosiery, rugs, blankets and fabrics are greatly benefited by a reduced tendency to accumulate and maintain electrostatic charges, a permanent anti-static property as a characteristic of the polymer and the fibers produced therefrom is highly desirable.

Presently, in the commercial production of nylon fibers the as-spun filaments are given a treatment to improve their electrostatic and handling properties. This treatment usually consists of passing the filaments, while in the form of a bundle, through a bath or over a wheel coated with a treating or finishing liquid. The finish thus received by the filaments is nothing more than a coating and is not of a permanent nature. Most, if not all of the anti-static agent on the fiber surface is lost in subsequent processing of the filament by mechanical handling, heating, washing, scouring and dyeing. If the anti-static agent does remain on the fiber until the final end product is produced it often becomes less effective after the end product is used for a period of time, and especially after a number of washings or dry cleaning operations.

Efforts have been made in the past to produce permanent antistatic polyamide fibers and articles by the application of a more permanent coating. Also, efforts utilizing hydrophilic anti-static type comonomers in the polyamide formation have been tried. For various reasons such as a resulting harsh fiber surface or sacrifice to good fiber physical properties, these methods have not been satisfactory.

Accordingly, it is an object of the present invention to provide modified polyamides and fibers produced therefrom which possess a high rate of dissipation of electrostatic charges.

Another object of this invention is to provide modified polyamides and fibers produced therefrom which possess a high resistance to the accumulation of electrostatic charges.

It is still a further object of this invention to provide modified polyamides and fibers derived therefrom which possess a permanent antistatic property even after multiple washings.

These and other objects and advantages will become apparent in the course of the following detailed description of the invention.

In general, these objects are attained by providing a fiber-forming synthetic linear polycarbonamide having recurring amide groups as on integral part of the main polymer chain, and wherein said groups are separated by at least two carbon atoms, containing from 0.1 to about 20.0 weight percent, based on the weight of said polycarbonamide, of a polyalkyoxylated triglyceride of a saturated fatty acid having 12 to 30 carbon atoms. These triglycerides may be represented by the formula:

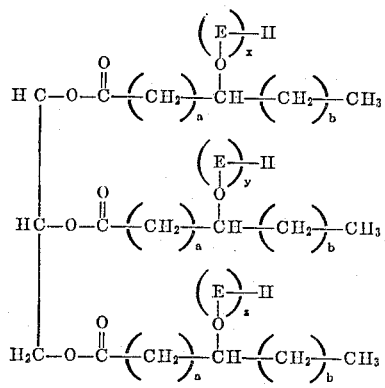

wherein $a$ and $b$ are integers from 2 to 26 with the proviso that the sum of $a+b$ is at least 10. E is an alkyleneoxy radical containing 2 to 5 carbon atoms, and $x$, $y$, and $z$ are integers greater than zero and wherein the sum of $x+y+z$ is equal to a value of between 50 and 500.

The polyoxyalkylene portion of the glyceride i.e., $(E)_x$, $(E)_y$ and $(E)_z$ should be in the molecular weight range between 2,000 and 22,000 and may be ethoxy, propoxy, butoxy, or pentoxy. The long chain saturated fatty acids of the triglyceride may have from 12 to about 30 carbon atoms, with 12 to 25 being preferred. A preferable concentration of the modifying agent to be used is from 1.0 to 15.0 weight percent. These polyalkoxylated triglycerides are particularly desirable modifying agents as they are very stable in the melt polymerization cycle, the processing procedures and under the conditions of use.

The polyalkoxylated triglyceride may be added to the polymer-forming reactants at the initial stage of the polymerization or during the course of the polymerization. This modifying agent may also be dispersed into the polymer melt just prior to extrusion into filaments or it may be mixed with polymer flake prior to the melt spinning of the flake.

The long chain saturated fatty acids, which make up the triglyceride, may contain from 12 up to about 30 carbon atoms with 12 to 25 being preferred. Examples of suitable acids which are within the scope of and useful in this invention are the hydroxy derivatives of lauric acid, myristic acid, palmitic acid, stearic acid, behenic acid, cerotic acid, and the like. The hydroxy derivatives of these saturated fatty acids are easily produced by hydroxylating the corresponding unsaturated fatty acid by known methods. If necessary after hydroxylation, any remaining double bonds may be removed by hydrogenation, for example with hydrogen gas. It is important, however, that the triglyceride used in the present invention be free from carbon to carbon unsaturation. The reason for this is that the unsaturated fatty acid portion is subjected to degradation under the conditions to which polyamide fibers are normally subjected, which degradation results in yellowing of the filaments.

A preferred modifying agent in accordance with this invention is the ethoxylated triglyceride of hydroxy stearic acid. One reason for the preference of this compound is that it is readily available as a derivative of castor oil. Castor oil is known to consist of about 88 percent of the glyceride ester of ricinoleic acid, which may be represented by the following formula:

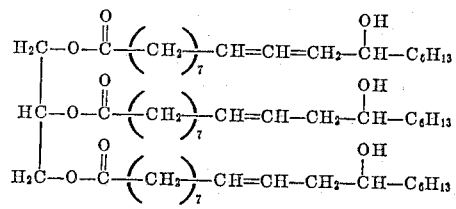

when the above glyceryl triricinoleate is polyethoxylated by known methods, it yields a compound of the following structure:

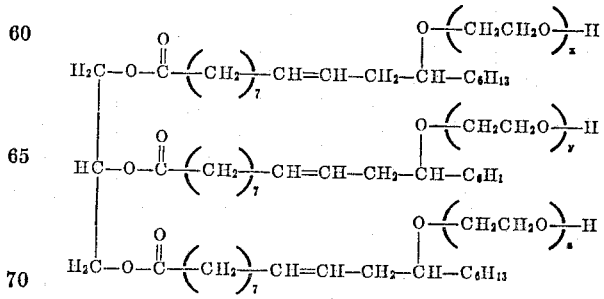

wherein $x$, $y$, and $z$ are integers as defined above. When the glyceryl triricinoleate is hydrogenated prior to polyethoxylation then the product of the polyethoxylation may be designated polyethoxylated hydrogenated castor oil, or polyethoxylated glyceryl tristearate and would have the structure:

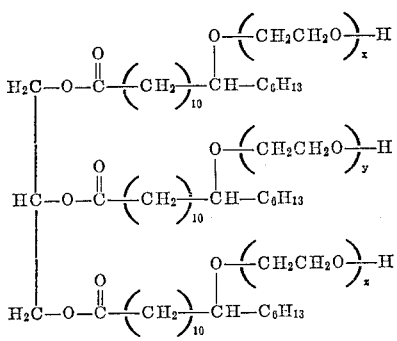

This compound is preferred due to its availability and to its ability to be purified to a high degree and thus the discoloration of the polycarbonamide to which it is added is extremely slight.

The amount of alkylene oxide attached to the triglyceride is important to the extent that it must be sufficient to allow for good dispersion in the polymer. It has been found that less than about 50 moles (i.e., about 2,000 M.W.) results in a poorly dispersed modifying agent. About 500 moles (i.e., about 22,000 M.W.) has been found to be the practical upper limit since it is very difficult to alkoxylate the triglyceride with higher molecular weight material.

The modified synthetic linear polyamides as described herein are prepared by procedures well known in the art and commonly employed in the manufacture of unmodified polyamides. That is, the reactants are heated at a temperature of from 180° C. to 300° C., and preferably from 200° C. to 295° C. until the product has sufficiently high molecular weight to exhibit fiber-forming properties. This condition is reached when the polyamide has an intrinsic viscosity of at least 0.4 in accordance with the definition of intrinsic viscosity as given herein above. The reaction can be conducted at superatmospheric, atmospheric or subatmospheric pressure. Often it is desirable, especially in the last stage of the reaction, to employ conditions, e.g., reduced pressure, which will aid in the removal of the reaction by-product. Preferably, the reaction is carried out in the absence of oxygen e.g., in an atmosphere of nitrogen.

For convenience, when a diamine and dicarboxylic acid are used in the preparation of a polyamide, it is usually desirable that the dicarboxylic acid be introduced into the reaction as a preformed salt, i.e., diamine salt. However, this is a matter of convenience only since the dicarboxylic acid and a corresponding molecular quantity of diamine may be in the form of uncombined diacid-diamine when brought into the reaction zone.

The synthetic linear polycarbonamides of this invention may be prepared, spun and drawn under conventional, polyamide-forming production conditions. In addition to the aforedescribed modifying agents, delustrants, antioxidants, plasticizers, viscosity stabilizers, and other like materials may be used in the preparation of the polyamides of this invention.

The novel polycarbonamides of the present invention are of primary interest for use in the manufacture of filaments, yarns and fabrics. They are, however, equally useful in end products such as films, coatings, bristles, fillings, flock, cables and the like.

In order to illustrate the invention and the advantages thereof with greater particularity, the following specific examples are given. It should be understood that they are intended to be only illustrative and are not intended to limit the invention and claims thereof. Parts and percentages are by weight unless otherwise indicated.

Example I

This example illustrates the preparation of a conventional fiber-forming polyamide and is to be used as a standard of comparison with polyamides of the same type modified in accordance with this invention.

A solution 150 parts of hexamethylene diammonium adipate (nylon 66 salt) dissolved in 50 parts of water was added to stainless-steel high pressure autoclave. The autoclave was equipped with a stirrer allowing the contents thereof to be agitated. The unit was purged of oxygen by the use of purified nitrogen. Next, the temperature and pressure were slowly raised until values of 243° C. and 250 p.s.i.g., respectively, were reached, during which time there was a continuous removal of steam as condensate. Also, during this period of temperature and pressure increase the mixture was continuously agitated. At this point the pressure reduction cycle began. The pressure was gradually reduced to atmospheric over a 25 minute period and the polymer melt was allowed to equilibrate for a period of 30 minutes at 278° C.

Upon completion of polymerization, the finished polymer was melt spun directly from the bottom of the autoclave through a 14-hole spinneret to yield a white multi-filament yarn. This yarn when drawn at a draw ratio of 4.7:1 possessed a tenacity of 6.12 grams per denier. The yarn was later converted to a fabric suitable for static testing.

Example II

This example illustrates the preparation of filaments from the polymer, polyhexamethylene adipamide modified in accordance with this invention.

The following materials were added to a stainless-steel high-pressure autoclave; 150 parts of hexamethylene diammonium adipate, 50 parts of water, and 2.0 weight percent (based on the weight of the unmodified polyamide) of hydrogenated castor oil polyethoxylated with 200 moles of ethylene oxide per mole of the glyceride. The autoclave was then purged of air using purified nitrogen. Next, the temperature and pressure in the autoclave were slowly raised until values of 220° C. and 250 p.s.i.g., respectively, were reached. The temperature was then further increased to 243° C. while the pressure was maintained at 250 p.s.i.g. During this period of increasing temperature and pressure, the mixture was slowly agitated by means of a wall scraping blade contained within the autoclave. At this point the pressure within the autoclave was gradually reduced to atmospheric over a 30 minute period. During this pressure reduction cycle the temperature was made to level out at 278° C., at which point the polymer melt was allowed to equilibrate for 30 minutes.

The resulting molten polymer was melt extruded directly from the bottom of the autoclave through a 14-hole spinneret to yield a white multi-filament yarn. Upon being drawn at a draw ratio of 4.85:1 this yarn exhibited a tenacity of 5.86 grams per denier. The yarn was later converted into a fabric suitable for static testing.

Example III

A batch of polymer was prepared in the manner identical to that employed in Example II except that 8.0 weight percent (based on the weight of the unmodified polyamide) of the modifier of Example II was used in lieu of 2.0 weight percent as in Example II.

This finished polymer was then melt spun directly from the bottom of the autoclave through a 14-hole spinneret to yield a white-filament yarn. The yarn was subsequently drawn at a draw ratio of 4.78:1 to yield yarn having a tenacity of 6.59 grams per denier. This yarn was later converted into a fabric suitable for static testing.

Example IV

A batch of polymer was prepared in the manner identical to that employed in Example II except that 14.0 weight percent (based on the weight of the unmodified polyamide) of the modifier of Example II was used in lieu of 2.0 weight percent as in Example II.

This finished polymer was then melt spun directly from the bottom of the autoclave through a 14-hole spinneret to yield a white-filament yarn. The yarn was subsequently drawn at a draw ratio of 4.67:1 to yield yarn having a tenacity of 4.74 grams per denier. This yarn was later converted into a fabric suitable for static testing.

In order to demonstrate the practical usefulness of the modified polyamide, of the present invention, comparative tests of the yarns of the above examples were conducted to determine relative decay or dissipation of the electrostatic charge built up on the yarn. As has been stated, the yarns of each of the above examples were converted into a fabric in the yarn of a knitted tube for convenience in electrostatic testing. The fabric samples of each of the above examples were run at comparable conditions on a yarn electrostatic measuring instrument to determine the time required for the decay of one-half of the static charge build up on the fabrics. The testing was done and the measurements were made on a dynamic static tester similar to that described in detail in vol. 40, American Dyestuff Reporter, pp.164–168 (1951).

In brief, the method of testing involves attaching the test fabric to an aluminum cylinder which is rotated at approximately 300 revolutions per minute. The fabric on the cylinder of the test instrument is then electrostatically charged by allowing it to rub against a second fabric surface, said second fabric surface being held stationary. After two minutes of rubbing contact, the contact between the two fabric surfaces is broken, and while the fabric on the aluminum cylinder is still rotating, the time required for the decay of one-half the static charge build up on the rotating fabric sample is measured electronically. All testing was done at standard conditions, that being 35 percent relative humidity and 70° F.

The fabric samples of all the above examples were put through a total of twenty-five standard washings prior to conduction the static tests as above described with the exception of Example I which was washed five times. The standard washing consists of agitating the fabrics at 140° C. for a period of 20 minutes in a scour solution composed of 0.1 percent Triton X–100, which is a non-ionic surfactant, and 0.1 percent tetra sodium pyrophosphate, said solution having a liquor-to-fiber ratio of 40:1. After five of these washings the fiber samples were dried and conditioned for a period of 24 hours at 35 percent relative humidity and 70° F. temperature.

In these tests, the shorter the time required for the dissipation of the half-life of the static charge build up on the fabric, the greater the degree of anti-static property. That is to say, the greater the antistatic properties of the fabric the less time required for the decay of half the static charge built up on the fabric.

In the following tests results yarn samples of Example I (filaments formed from unmodified polyhexamethylene adipamide) are compared with yarn samples of Examples II, III, and IV (filaments formed from polyhexamethylene adipamide, modified in accordance with this invention).

| Example: | Time (sec.) for static charge decay (half-life), sec. |
|---|---|
| I (control) | 6720 |
| II | 820 |
| III | 38 |
| IV | 18 |

From the above table it is readily apparent that the yarns prepared from polyamides obtained in accordance with this invention are capable of dissipating accumulated electrostatic charges at a greatly increased rate when compared with yarns prepared from conventional polyamides.

The improvement in antistatic property has been obtained without seriously degrading the other physical properties. That is to say, that the physical properties such as tenacity, elongation, and relative viscosity of the fibers produced in accordance with this invention have been maintained near the same desirable levels as those possessed by the unmodified polyamides.

As previously noted, the products obtained in the practice of this invention are particularly useful in the manufacture of fibers, fabrics, garments, upholstery and rugs where polyamide filaments having a high static electrical charge dissipation are especially desirable. The products obtained in the practice of this invention may also be used to advantage in the manufacture of films, bristles, coating, and the like where the ultimate end use intended will be benefited by the employment of a polymer having low antistatic characteristics.

As many widely different embodiments of this invention may be made without departing from the spirit and scope thereof, it is to be understood that the invention is not to be limited by the specific embodiments set forth herein but only by claims which follow.

What is claimed is:

1. A fiber-forming synthetic linear polycarbonamide having recurring amide groups as an integral part of the main polymer chain, and wherein said groups are separated by at least two carbon atoms, containing from 0.1 to about 20.0 weight percent, based on the weight of said polycarbonamide, of a polyalkoxylated triglyceride of a saturated fatty acid wherein the polyalkoxy portion has a molecular weight of between about 2,000 and 22,000, and wherein the saturated fatty acid has 10 to 30 carbon atoms.

2. A fiber-forming synthetic linear polycarbonamide as defined in claim 1 wherein said polyalkoxylated glyceride is polyalkoxylated hydrogenated castor oil.

3. A fiber-forming synthetic linear polycarbonamide as defined in claim 1 wherein said polyalkoxylated glyceride is polyethoxylated hydrogenated castor oil.

4. A fiber-forming synthetic linear polycarbonamide as defined in claim 3 wherein said polyethoxylated hydrogenated castor oil is present in an amount of from 1.0 to 15.0 weight percent, based on the weight of said polycarbonamide.

5. The fiber-forming synthetic linear polycarbonamide as set forth in claim 4 wherein said polycarbonamide is polyhexamethylene adipamide.

6. A textile fiber comprising the polycarbonamide as defined in claim 1.

7. A textile fiber comprising the polycarbonamide as defined in claim 4.

References Cited

UNITED STATES PATENTS

| 3,341,343 | 9/1967 | Beiswanger et al. | 260—18 X |
| 3,329,557 | 7/1967 | Magat et al. | 161—172 |
| 3,297,653 | 1/1967 | Tomiyama et al. | 260—75 |
| 3,052,646 | 9/1962 | Doggett | 260—18 X |
| 2,998,295 | 8/1961 | Goldann | 8—115.5 |
| 2,252,555 | 8/1941 | Carothers | 260—78 |

FOREIGN PATENTS

| 616,953 | 4/1962 | Belgium. |
| 635,558 | 1/1961 | Belgium. |
| 1,020,298 | 2/1966 | Great Britain. |
| 820,541 | 9/1969 | Great Britain. |

DONALD E. CZAJA, *Primary Examiner.*

C. W. IVY, *Assistant Examiner.*